Feb. 23, 1932.  D. H. BELLAMORE  1,846,079
DISK WHEEL
Filed Oct. 19, 1926
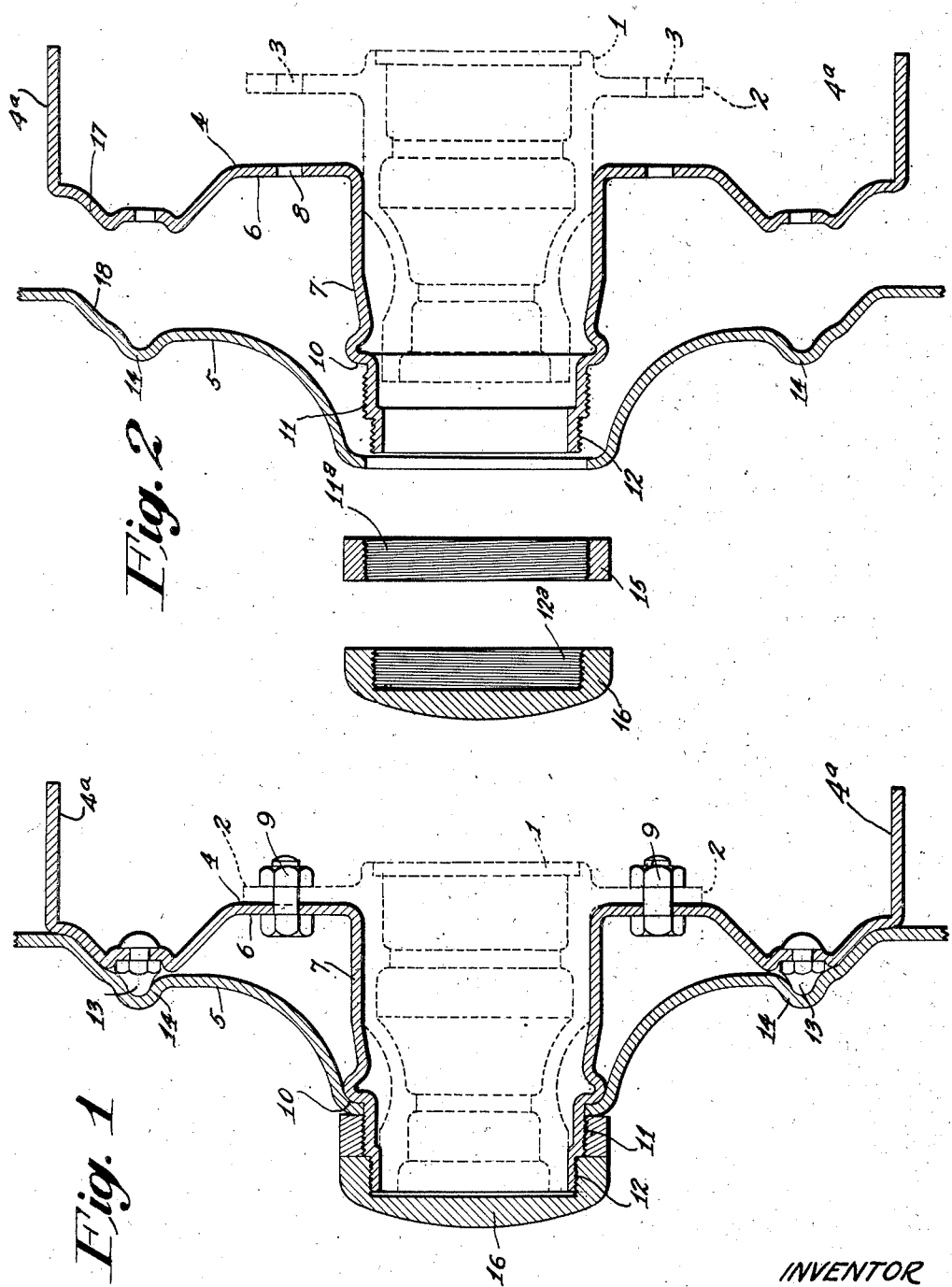
INVENTOR
David H. Bellamore
BY Cornelius Zabriskie
ATTORNEY Patented Feb. 23, 1932

1,846,079

UNITED STATES PATENT OFFICE

DAVID H. BELLAMORE, OF NEW YORK, N. Y., ASSIGNOR, BY MESNE ASSIGNMENTS, TO BENDIX BRAKE COMPANY, OF CHICAGO, ILLINOIS, A CORPORATION OF ILLINOIS

DISK WHEEL

Application filed October 19, 1926. Serial No. 142,610.

This invention is a disk wheel for motor vehicles and the object of the invention is to provide for the simple and efficient mounting of a disk wheel on a conventional wood wheel hub. It is frequently desired to remove the wooden spokes, felly and rim from the hubs of cars so equipped and replace disk wheels in the place of the wooden wheels.

The object is to provide simple and economical means for accomplishing this result. In all wooden wheels, the hubs are provided with fixed and removable flanges and the present invention contemplates the mounting of a disk with reference to this fixed flange through the employment of an intermediate member adapted to be secured to the fixed flange and provided with means whereby the disk may be secured to said intermediate member.

The wheel of the present invention is a single disk wheel, that is to say, is a wheel wherein the hub is spaced from the rim by a single disk and this disk is maintained in place by unitary means.

In the preferred practical form of the present invention, I remove the wooden wheel and movable flange and associate an intermediate member with the fixed flange of the hub as by bolting, riveting or otherwise, in such manner that it becomes more or less permanently mounted in fixed position on the hub. The intermediate member is provided with an outwardly extending radial part carrying driving lugs and also embodies a sleeve-like portion adapted to embrace or encircle the hub. This sleeve-like portion is threaded to receive a lock nut and is provided with an opposed shoulder. The rim supporting disk of the wheel has a central hub opening from which are spaced apertures or depressions so that when the disk is positioned over the hub, the hub will extend through the hub opening of the disk while the driving lugs of the intermediate member will project into the apertures or depressions of the disk.

The lock nut may be then screwed upon the threaded portion of the sleeve for the purpose of clamping the central portion of the disk between said lock nut and the shoulder of the sleeve and simultaneously bringing and maintaining the depressions or apertures of the disk in cooperative relation with the driving lugs of the intermediate member. A hub cap may be associated with the sleeve to close the outer end thereof or said sleeve may be closed at its end by an integral part thereof.

For cars having four wheel brakes, the intermediate member may be made to constitute a specially formed brake drum by providing the outer periphery of said member with a laterally extending cylindrical flange with which the conventional brake bands may cooperate in the usual manner.

Features of the invention, other than those adverted to, will be apparent from the following description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a central section of the central portion of a wheel embodying the present invention, showing the parts in assembled relation; and, Figure 2 shows said parts dismantled.

Referring to the drawings, 1 designates a hub of a conventional wood wheel which, as is common, is provided with a fixed flange 2, perforated at 3 for the hub bolts. 4 designates what I term the intermediate member, so-called since it forms a connection between the hub and the disk 5. The intermediate member 4 may be struck up from sheet metal, may be cast or otherwise formed, but in any event embodies a substantially radial portion 6 and a tubular or sleeve portion 7. The sleeve portion 7 is of such size and shape that it is adapted to be slipped over the hub after the assembled flange and wood wheel parts have been removed, while the radial portion 6 is adapted to bear against the outer face of the fixed flange 2 and is perforated as at 8, so that bolts or rivets 9 may be passed through the alined openings 3 and 8 for the purpose of securing the intermediate member firmly to the fixed flange.

The sleeve portion 7 is upset or otherwise formed intermediate its ends to provide a shoulder 10 and beyond the shoulder the free end of said sleeve is threaded. In practice, the threaded portion of the sleeve is preferably stepped to provide two steps, the one of greater diameter having a left hand thread as shown at 11 and the one of smaller diameter having a right hand thread as shown at 12, although this relationship may be reversed or both shoulders may be threaded right or left handed.

The disk 5 constitutes the rim supporting disk of the wheel and a rim of any suitable or conventional form is associated with its outer periphery. Its center is perforated with an opening sufficiently large to permit the passage of the disk over the stepped threaded ends of the sleeve 7, but to preclude its passage beyond the shoulder 10.

The parts are so proportioned that when the perforated center of the disk is slipped over the stepped portion of the sleeve, the margin of the central perforation will abut the shoulder 10 substantially simultaneously with the engagement of an outer portion of the disk with the radial part of the intermediate member. The disk and said radial portion of the intermediate member engage in face abutting relation a short distance from the hub and at substantially this point a series of driving lugs 13 are annularly disposed about the intermediate member and are adapted to project into depressions 14 on the inner face of the disk as clearly shown in Figure 1. This is the preferred construction, since the driving lugs are not visible from the outside of the wheel, yet if desired the disk may be perforated in lieu of the depressions shown and the driving lugs may extend through such perforations. The driving lugs may be associated with the intermediate member in any suitable way or may be formed integral therewith, but are here shown as comprising short bolts, the nuts of which are shaped to constitute driving lugs.

After the disk has been positioned in the manner described, it may be locked in this position by screwing on to the raised step an interiorly threaded collar 15, which serves to jam or clamp the disk firmly against the shoulder 10. If desired, the disk may be so proportioned that it will be slightly flexed by this operation, so as to resiliently maintain the depressions 14 in cooperative relation with the driving lugs.

The end of the sleeve is closed in the construction shown by means of a hub cap 16, which is screwed upon the lower step. The collar 15 is interiorly threaded with a left hand thread, as shown at 11a, while the hub cap is interiorly threaded with the right hand thread as shown at 12a so that the hub cap serves as a lock nut for the collar. It is within the purview of this invention to eliminate the lower step entirely, as well as the hub cap 16 and form the sleeve with an integrally closed end, but, in practice, I prefer to employ a hub cap since this construction permits of access to the interior of the hub and bearings or the removing of the wheel without removing the intermediate member.

If the wheel is to be used as a rear wheel or as a front wheel on cars having four wheel brakes, the member 4 may be provided at its outer periphery with a laterally extending cylindrical flange 4a with which the conventional brake bands may cooperate in the usual manner. The intermediate member, when thus formed, may be termed a brake drum with an integral attaching sleeve embracing the hub and threaded to receive a nut to hold the disk in position.

It will be noted from the showing of the drawings that the radial portion of the intermediate member is flared inwardly at its outer margin for the purpose of providing a shoulder 17 and the disk 5 is complementarily shaped to provide a shoulder 18, which, when the parts are in assembled relation as shown in Figure 1, will bear upon the shoulder 17 of the intermediate member. The advantage of this construction is that radial thrust will be imposed directly upon the shoulder 17 and the driving lugs will not be subjected to excess load of a character which would tend to produce a shearing action. In the construction as shown, the shoulders 17 and 18 are inclined, so that when the disk is forced into position relative to the intermediate member, the shoulders 17 and 18 will come together with a wedging fit producing a tight joint devoid of lost motion. This is the construction preferred, but, if desired, stepped shoulders may be provided in lieu of the sloping shoulders shown. In any event, the construction is such that the driving lugs will be exposed only to driving torque and will not be required to carry the load to which the wheel is subjected.

Having thus fully described the invention, what I claim as new and desire to secure by Letters Patent is:

1. A disk wheel embodying a flanged hub, a one-piece brake drum removably secured to the flange on said hub, a rim supporting disk removably secured to the brake drum member and having interfitting engagement therewith to rotate as one piece and unitary means threaded upon the brake drum member for demountably securing the disk in interfitting engagement thereon.

2. A disk wheel embodying a hub member, a flange on said hub member, a brake drum member seated on said hub and secured to said flange substantially in the median plane of the wheel, said member being provided with a substantially radially extending flange having a sloping annular seat formed thereon, a disk provided with a complementary annular seat, unitary means threaded on the brake drum member for forcing the disk and brake drum member into assembled relation with the seat of the disk in wedging engagement with the seat of the brake drum member, and driving lugs associated with the brake drum member positioned in a plane extending outwardly and laterally of the forementioned connection between the brake drum member and hub flange, said driving lugs adapted to extend into complementary depressions in the disk when the parts are in assembled relation, the driving lugs being adapted to take the circumferential driving torque and the seat of the brake drum member being adapted to sustain the radial load to which the disk is subjected.

In testimony whereof I have signed the foregoing specification.

DAVID H. BELLAMORE.